Patented Oct. 1, 1946

2,408,696

UNITED STATES PATENT OFFICE 2,408,696

TREATMENT OF CARBON BLACK

Hugh M. Smallwood, Nutley, N. J., assignor to United States Rubber Company, New York, N. Y., a corporation of New Jersey No Drawing. Application July 13, 1940, Serial No. 345,429

8 Claims. (Cl. 106—307)

The present invention relates to the treatment of carbon black.

An object of the invention is to obtain a modification of certain carbon blacks which has the property of yielding rubber mixes having abnormally low viscosities and electrical conductivities, together with exceptionally low hysteresis in the vulcanized condition. Other objects will be apparent from the following description.

This invention comprises treating hydrogen-containing carbon black with gaseous chlorine under such conditions as will leave more than about 1% hydrogen chloride adsorbed on the black. Any carbon black prepared from natural gas or from aromatic hydrocarbons can be used in the practice of this invention. The treatment of the black is spoken of as a treatment with chlorine. Bromine, however, can be successfully substituted for chlorine, but the latter is preferable because it is cheaper.

Carbon black treated according to the present invention gives a product which possesses the following advantages:

(1) When mixed into rubber the product has such low viscosity that much higher loadings of the treated carbon black can be used than of untreated black.

(2) The mixture with rubber has an abnormally low electrical conductivity, and, when vulcanized, an abnormally low hysteresis.

The process consists in passing gaseous chlorine over the carbon black at any temperature in the range from room temperature to 500° C. Throughout this entire range a reaction takes place between the chlorine and the carbon black. The main features of this reaction will now be described.

Carbon black of the present invention contains several tenths of a per cent of hydrogen in a state other than as loosely absorbed water. It is firmly attached to the carbon, since this hydrogen is only slowly driven off from the carbon on heating in a current of nitrogen at 1000° C.

When chlorine is passed through carbon black at temperatures in the range given above, hydrogen chloride is formed. In the lower part of the temperature range evidence of a vigorous reaction is found in the fact that appreciable warming of the carbon black occurs at the point where the chlorine first encounters the black. As the treatment proceeds, this warm zone passes throughout the entire body of the black. When chlorine is passed rapidly into large bodies of carbon black, in which the heat developed in the reaction cannot be rapidly dissipated, mild explosions may take place.

The rate of passing chlorine through the carbon black is, therefore, determined by the size and shape of the container used to confine the carbon black. The rate may vary through a wide range without appreciably affecting the properties of the product. The treatment is preferably continued until chlorine issues freely from the outlet, i. e., until the reaction has been completed.

As noted above, considerable quantities of hydrogen chloride are formed in the course of the treatment of the carbon black with chlorine. Part of this hydrogen chloride is evolved as such, and part is retained in the adsorbed state on the carbon black. The relative amounts of hydrogen chloride evolved or retained on the black will depend primarily on the temperature at which the treatment is carried out. The higher the temperature of treatment the greater the proportion of hydrogen chloride evolved, and the smaller the proportion of adsorbed hydrogen chloride remaining on the black.

Substantially all of the hydrogen chloride formed in the process can be removed from the carbon black by heating it in a stream of nitrogen at temperatures in the neighborhood of 400° C., or by washing the chlorinated black with hot water. Experiments have shown that the attainment of desirable properties in the rubber mix is dependent upon retaining as much adsorbed hydrogen chloride on the black as is possible. The preferred treatment, therefore, consists in treatment of the carbon black with chlorine at temperatures as close to room temperature as possible.

Treatment of carbon black with hydrogen chloride under conditions which leave appreciable amounts of hydrogen chloride adsorbed on the black are not equivalent to the chlorine treatment, since the desirable properties are not obtained in full measure.

Typical treatments of black are given in Table I, blacks A, B, C and E being examples of my invention.

Table I

|  | A | B | C | D | E |
|---|---|---|---|---|---|
| Black treated with | $Cl^2$ | $Cl^2$ | $Cl^2$ | HCl | $Br^2$. |
| Temp. of treatment | 340–470° C | 151–173° C | Room | Room | 110–180° C. |
| Time of treatment, min | 120 | 244 | 120 | 1020 | 120. |
| Weight of black, gm | 305 | 327 | 302 | 1900 | 322. |
| Per cent HX retained | 1.2 | 3.3 | 4.0 | 2.6 | 4.0. |

In these experiments a typical channel black of the type used for manufacture of tire treads was used throughout. This black contained approximately .2% hydrogen as determined by chemical analysis. The black was, in all cases, confined in a glass container equipped with an inlet for chlorine at one end and with an outlet at the other end for removal of evolved gaseous products and excess chlorine.

In those cases in which experiments were made at elevated temperatures, the glass container was heated externally by means of an electrical resistance furnace. After the treatment, the amount of adsorbed hydrogen chloride was determined by the following procedure:

Five-gram samples of carbon black were refluxed for thirty minutes with 150 cc. distilled water. The samples were then filtered while hot, and washed six or seven times with 30 cc. portions of hot water. The filtrate and washings were combined, allowed to cool, and titrated with standardized sodium hydroxide solution. Preliminary experiments showed that prolonging the washing failed to remove any further acid from the black.

A detailed description of the preparation of chlorinated carbon black C will now be given. 302 grams of a standard rubber channel black was placed in a glass tube, approximately 4 cm. inside diameter and 75 cm long. The bottom of the tube was constricted and closed with a loose plug of asbestos. At this point an 8 mm. glass tube had been sealed to the large tube. Commercial chlorine from a cylinder was introduced at the smaller tube attached to the large tube. The upper end of the large tube was connected, by means of a ground joint, to a smaller tube leading to a hood for removal of waste gases. Chlorine was passed through the column of carbon black at a rate of approximately 50 cc. per minute for a period of 2 hours. A slight warming of the black was noticed during the course of the treatment, but apart from this, the temperature remained at room temperature. The black so obtained was found to contain 4.0% adsorbed hydrogen chloride by means of the analytical procedure described above.

Experience with this process indicates that the shape of container used for the black, and the rate of streaming chlorine through the black, are relatively unimportant. Temperature is of importance only insofar as it controls the amount of hydrogen chloride remaining on the black.

Various means of bringing the carbon into contact with the chlorine could be used without departing from the spirit of this invention. For example, it might be advisable, when treating large quantities of carbon black, to drop the black slowly through an atmosphere of chlorine.

The blacks prepared as above were compounded in rubber according to the following formula (parts are by weight):

|  | Parts |
|---|---|
| Smoked sheet | 100 |
| Treated black | 50 |
| Pine tar | 2 |
| Stearic acid | 4.5 |
| Fast curing zinc oxide | 2 |
| Acetone-diphenylamine reaction product | 1.7 |
| N,N'-diphenyl p-phenylene diamine | 0.3 |
| Thiazole accelerator | 1.12 |
| Sulfur | 2.62 |

The compounds of rubber and chlorinated blacks were mixed as follows. Rubber was broken down in the customary manner on a 12" mill with rolls maintained at 200–250° F. The carbon black, treated or untreated control, was then added in the customary manner, and milling continued with cutting until an intimate mixture had been obtained. The remaining compounding ingredients were then added in the order given above. Experience indicates that the usual methods of preparing mixes, common to the art, are adequate to enable observation of the unique properties of chlorinated black.

The mixes were cured as usual in a steam heated platen press for 40 min. at 143° C.

Table II

|  | F | G | H | I | J |
|---|---|---|---|---|---|
| Above base mix containing | Untreated control | A | C | D | E. |
| T–50 | –11.4 | –2.5 | +2.3 | –4.8 | –4.6. |
| Electrical resistivity (ohm-cm.) | $2.5 \times 10^6$ | $2 \times 10^6$ | Greater than $10^{13}$ | $1 \times 10^7$ | $6 \times 10^6$. |
| Torsional hysteresis at 280° F | .157 | .148 | .103 | .144 | .134. |

The torsional hysteresis test is described in Gerke et al., U. S. P. 2,118,601. The electrical resistivity was measured according to the technique described in the Gerke et al. patent.

In Table II note that the halogenated blacks (Formulas G, H and J) give higher electrical resistivity and lower torsional hysteresis than the control (Formula F) containing untreated black. Further, the black treated with hydrogen chloride (D, Formula I) gave very little lowering of hysteresis and only a four-fold change in resistivity, even though it contained more adsorbed hydrochloride than black A.

It will be noted from the foregoing data that the chlorinated carbon black exerts a strong retarding action upon the vulcanization reaction, as judged by T–50. This is due to the well-known retardation of vulcanization by strong acids. This effect can be overcome by adding to the mix, along with the customary curing ingredients, sufficient basic material to neutralize the hydrogen chloride contained on the black. The bases used in this operation must be sufficiently strong to form salts with hydrochloric acid which do not retard vulcanization. Zinc oxide is not a sufficiently strong base for this purpose. Sodium hydroxide is sufficiently basic, as are also the quaternary bases. Similarly, compounds such as triethanolamine can be used advantageously for this purpose.

The optimum amount of basic material is best determined by preliminary experiments in rubber, rather than by calculation of the amount of basic equivalent to the acid adsorbed on the carbon black. It has been found that the optimum amount of base is rather less than that equivalent to the acid content of the black. This is probably due to the reaction of part of the hydrogen chloride with the rubber hydrocarbon. Alternatively, it may be that some of the hydrogen chloride is evolved during the mixing operation.

In any event, the chlorinated black may be mixed into rubber, and the excess acid may be neutralized without any disadvantage to the resultant vulcanizate.

In these experiments the chlorinated black was added to the rubber as described above. After the black was completely incorporated, the base was added. The mix was then blended for 5 min. The curing ingredients were then added. The following data were obtained.

The carbon black treated by the present invention is to be distinguished from activated charcoal, which is not in the finely divided form such as channel black, but is in a granular porous state.

Having thus described my invention, what I claim and desire to protect by Letters Patent is:

1. A process which comprises treating finely divided hydrogen-containing carbon black with gaseous halogen for a time and at a temperature sufficient to leave more than about 1% hydrogen halide adsorbed on the black.

2. A process which comprises treating finely divided hydrogen-containing carbon black with gaseous chlorine for a time and at a temperature sufficient to leave more than about 1% hydrogen chloride adsorbed on the black.

3. A process which comprises treating finely divided hydrogen-containing carbon black with gaseous chlorine at a temperature approximating room temperature and for a time sufficient to leave more than about 1% hydrogen chloride adsorbed on the black.

4. A process which comprises treating finely divided hydrogen-containing channel black with

Table III

|  | K | L | M | N |
|---|---|---|---|---|
| Base mix as above with | Untreated black | Chlorinated black (5.0% HCl) | Chlorinated black (5.0% HCl) | Chlorinated black (5.0% HCl) |
| Plus: |  |  |  |  |
| 30% aqueous NaOH |  |  | 8.28 |  |
| Triethanolamine |  |  |  | 10.3 |

CURED 60' AT 143° C.

|  |  |  |  |  |
|---|---|---|---|---|
| T-50 | −14.2 | +13.5 | −17.4 | −7.8 |
| Viscosity (Mooney) | 96 | 80 | 58 | 65 |
| Electrical resistivity | 2.5×10⁶ | Greater than 10¹³ | Greater than 10¹³ | Greater than 10¹³ |
| Torsional hysteresis at 280° F | .179 | .275 [1] | .068 | .100 |

[1] This high value is due to the gross retardation of cure. Note that the mixes made from chlorinated black have viscosities less than that of the control (Formula K).

The low viscosity of the rubber mix, as a result of chlorination of the carbon black prior to mixing with the rubber, was further demonstrated by the preparation of a mix of 100 of rubber, 90 parts of chlorinated black containing 4.8% adsorbed hydrogen chloride, 2 parts of pine tar, 4.5 parts of stearic acid, and 14 parts of a 30% aqueous solution of sodium hydroxide. This mix had a viscosity of 116. A parallel mix containing untreated carbon black would be so hard as to be substantially non-plastic.

By the present invention there may be prepared a new type of carbon black which, when compared to the conventional type of channel black, gives a mix with rubber of abnormally low viscosity and electrical conductivity, together with a vulcanizate having abnormally low hysteresis. Carbon blacks of the color grades prepared according to the present invention may also be used to give inks and lacquers of greater fluidity than do conventional carbon pigments.

gaseous chlorine for a time and at a temperature sufficient to leave more than about 1% hydrogen chloride adsorbed on the black.

5. Carbon black derived from hydrogen containing carbon black and containing more than 1% hydrogen chloride adsorbed on the black.

6. A process which comprises treating finely divided hydrogen-containing carbon black with a gaseous halogen at a temperature and for a time sufficient to produce about 4% of hydrogen halide adsorbed on the black.

7. A carbon black derived from hydrogen-containing carbon black and having about 4% hydrogen halide adsorbed on the black.

8. A process which comprises submitting channel black to the action of chlorine for a time and at a temperature sufficient to leave a chlorine content of more than about 1% on the treated black.

HUGH M. SMALLWOOD.